Patented Apr. 18, 1950

2,504,159

UNITED STATES PATENT OFFICE 2,504,159

ANIMAL FEED AND METHOD OF IMPROVING THE SAME

Philip A. Singer and Harold J. Deobald, Peoria, Ill., assignors to Allied Mills, Inc., a corporation of Indiana No Drawing. Application May 24, 1946, Serial No. 672,166

14 Claims. (Cl. 99—2)

This invention relates to animal feed, and more particularly to dehydrated forage improved by the addition of an oil emulsion.

Dehydrated forage, including alfalfa meal, fodder, hays and grasses, canning factory by-products such as pea vines and the like, have been used as animal feed for some time. In handling dehydrated forage a considerable amount of dust is raised with the consequent danger of explosion and hazard to the health of those engaged in handling such material. Industrial safety literature continually emphasizes the danger of dust explosions and fires in addition to the mechanical irritation caused by the dust in the lungs, throat and nasal passages of the workers. The economic loss of the forage itself in the form of dust and siftage is also of prime importance. It has been found that about 5% of the weight of dehydrated alfalfa meal, for instance, is lost through siftage and dusting from the time the bag was filled at the processing plant to the time of its use in mixed feeds. This loss does not include the equal, if not greater, amount of material lost in the previous grinding and handling operations in the processing plant.

Another disadvantage of dehydrated forage in the form as presently used, is the dull color of the dehydrated material.

We have discovered that the addition of an emulsion of oil to pulverulent dehydrated forage eliminates the dust hazard and the excessive loss previously encountered in the handling of such material and also improves the color thereof. The improvement of the color and general appearance of the treated material is of an unexpectedly high order. For instance, the rather drab gray-green of sun-cured alfalfa meal, or meal faded through long storage, is restored to a live green comparable to dehydrated high quality leaf material, while in the higher quality meal the intensity of the green color is increased and the slight gray coloration disappears. There is also an improvement in the mobility of the material in that the oil causes it to be more free flowing, that is a lubricated mass as distinguished from the dry choking type of meal of commerce.

For preparing the emulsion we have found that vegetable phosphatides such as "lecithin" are a superior emulsifying agent, although many other emulsifiers have been used successfully. For instance, we have found that an ordinary soap will stabilize such an emulsion and produce a satisfactory dispersion of the oil. Further tests with the various types of "lecithin," ranging from the crude foots which settle from hydraulic or expeller expressed oil to the more highly refined and bleached products, show that they are equally effective when used on the basis of their phosphatide content.

A typical satisfactory emulsion was prepared by mixing 25 parts by weight of crude expeller expressed soy bean oil foots (containing about 40% phosphatides) with 175 parts by weight of crude soy bean oil and heating the mixture with mild agitation to 70 degrees centigrade. This mixture was then added to 450 parts by weight of water with violent stirring. This emulsion contained about 1.5% phosphatide, 29.5% oil and 69% water. We have produced stable emulsions with as low as 1.2% phosphatide and 55% water. Less than these amounts result in thick relatively unstable mixtures which have been found difficult to handle with conventional equipment. All of the emulsions are, of course, subject to rancidification and bacterial decomposition if not used within a reasonable time. The emulsion should be applied within 24 hours after its manufacture. After the emulsion has been applied to the dehydrated forage, there is no tendency of the emulsion to decompose or rancidify.

In adding the emulsion to the dehydrated forage, we prefer to spray the emulsion on the material immediately after it has been ground and while it is being agitated in any suitable mixing chamber, although other methods of application may be employed. About 3 pounds of the emulsion will satisfactorily treat 100 pounds of average alfalfa meal, although as much as 5.5 pounds are required for particularly dry and dusty materials. No harm results from the use of a slight excess of emulsion.

For example, as much as 6 pounds of the emulsion may be used with each 100 pounds of forage. From the examples given it can be seen that oil and emulsifying agent are added to forage at quantities ranging from 0.92 to 1.84 pounds of oil and emulsifying agent for each 100 pounds of forage. The oil alone is present in the ratio of .8 to 1.6 pounds for each 100 pounds of forage.

The alfalfa meal of commerce usually contains a very low per cent of water so that the addition of the water contained in the emulsion does not increase the moisture content of the meal to a dangerous degree. The quantity of water contained in the emulsion is sufficient to increase the moisture content of the treated material from 1.5 to 2.5%, depending upon the quantities used. Since the material is violently agitated at the time of adding the emulsion, it is highly probable that some water added in the emulsion is vaporized. The amount of moisture in the product after being treated will be below 10% and the treated forage will store without spoilage. We have also found that the addition of the emulsion increased the ether extract content of the treated material somewhat, the amount of increase being 2%, or less. For example, in treating dehydrated alfalfa meal at the rate of 5 pounds of emulsion for each 100 pounds of meal, the ether extract increased 1.8%. Where 3 pounds of emulsion was used, the ether extract content of the meal was increased approximately 1%.

It should be noted that the effect of the addition of the emulsion is not transitory. The material remains dust-free indefinitely and does not revert to its original color and dusty character. The added moisture in the emulsion may be removed without the treated material reverting to its original state.

Emulsions of mineral oils may also be used in the process. However, the use of mineral oil could be objectionable because of its scouring effect upon cattle. The use of a vegetable oil emulsion does not have this disadvantage and has the further advantage of increasing the nutritive value of the treated material, in that vegetable oil is a food ingredient of high caloric value. When phosphatides are used as the emulsifier, the choline and phosphorous compound so necessary to a balanced ration is also included in the treated forage.

The foregoing detailed description has been given for clearness of understanding only and no unnecessary limitations should be understood therefrom.

We claim:

1. A dry, solid animal feed comprising: pulverulent dehydrated forage, an edible oil, and an emulsifying agent, the oil and emulsifying agent being substantially uniformly distributed throughout the forage and the ratio being approximately 0.92 to 1.84 pounds of oil and emulsifying agent to 100 pounds of forage.

2. Animal feed of the character described in claim 1, wherein said oil is a vegetable oil.

3. Animal feed of the character described in claim 1, wherein the emulsifying agent is a phosphatide.

4. A dry, solid animal feed comprising: pulverulent dehydrated forage, having a live green color, said color being normally obscured by an opaque coating thereover, a vegetable oil and an emulsifying agent, said oil and emulsifying agent being substantially uniformly distributed throughout said forage in the proportion of approximately 0.92 to 1.84 pounds of oil and emulsifying agent to 100 pounds of forage, whereby said coating is rendered transparent to said color.

5. The method of improving animal feed comprising: mixing a dehydrated forage with an aqueous emulsion of vegetable oil, the ratio being approximately 3 to 6 pounds of emulsion to 100 pounds of forage.

6. The method set forth in claim 5, where the emulsifier is a phosphatide.

7. The method of improving animal feed comprising: dehydrating forage, grinding the forage to produce a small particle size thereof, agitating the forage and substantially uniformly distributing an emulsion of vegetable oil throughout said forage while it is being agitated, the ratio being approxiamtely 3 to 6 pounds of emulsion to 100 pounds of forage.

8. The method as set forth in claim 14 wherein the ratio of emulsion to forage does not exceed approximately 6 pounds of emulsion to 100 pounds of forage.

9. The method set forth in claim 14 where the emulsifier is a phosphatide.

10. A dry solid animal feed comprising pulverulent dehydrated forage and vegetable oil, the oil being substantially uniformly distributed throughout the forage in the ratio of .8 to 1.6 pounds of oil to each 100 pounds of forage.

11. A dry, free flowing, solid animal feed, comprising: pulverulent dehydrated forage having a live green color, an edible oil, and an emulsifying agent, said oil and emulsifying agent being substantially uniformly distributed throughout said forage in a ratio of not less than approximately 0.92 pound of oil and emulsion to 100 pounds of forage, and said feed being substantially dust-free.

12. A dry, free flowing, solid animal feed, comprising: pulverulent dehydrated forage having a normally grayish color; vegetable oil and an emulsifying agent substantially uniformly distributed throughout said forage in a ratio of not less than approximately 0.92 pound of oil and emulsifying agent to 100 pounds of forage, whereby the natural green color of the forage is restored, and said feed being substantially dustfree.

13. The method of producing a dustless, free flowing animal feed, comprising: mixing approximately 100 parts by weight of dehydrated forage with not less than approximately three parts by weight of an aqueous emulsion of edible oil.

14. The method of producing a dustless, free flowing animal feed, comprising: dehydrating forage, grinding the forage to produce a small particle size thereof, and substantially uniformly distributing an emulsion of vegetable oil throughout said forage in a ratio of not less than approximately 3 pounds of emulsion to 100 pounds of forage.

PHILIP A. SINGER.
HAROLD J. DEOBALD.

REFERENCES CITED

The following references are of record in the file of this patent:

UNITED STATES PATENTS

| Number | Name | Date |
| --- | --- | --- |
| 1,194,276 | Constantine | Aug. 8, 1916 |
| 1,606,052 | Bollman | Nov. 9, 1926 |
| 2,198,214 | Musher | Apr. 23, 1940 |
| 2,395,067 | Richardson | Feb. 19, 1946 |